United States Patent [19]
Childress

[11] Patent Number: 5,972,524
[45] Date of Patent: Oct. 26, 1999

[54] DOUBLE LAP JOINT WITH WELDED Z-PINS

[75] Inventor: James J. Childress, Mercer Island, Wash.

[73] Assignee: The Boering Company, Seattle, Wash.

[21] Appl. No.: 08/950,499

[22] Filed: Oct. 14, 1997

Related U.S. Application Data

[62] Division of application No. 08/619,957, Mar. 20, 1996, Pat. No. 5,862,975.

[51] Int. Cl.[6] .............................. B32B 3/26; B32B 7/08; B32B 7/12
[52] U.S. Cl. .................. 428/615; 428/119; 428/120; 428/408; 428/902; 403/266; 403/271; 403/404; 52/309.2; 52/309.16
[58] Field of Search ...................... 428/102, 119, 428/120, 614, 615, 408, 458, 332, 339, 397, 401; 403/265, 266, 271, 404; 52/309.2, 309.16

[56] References Cited

U.S. PATENT DOCUMENTS

| | | |
|---|---|---|
| 2,531,782 | 11/1950 | Moore ...................... 188/234 |
| 3,187,242 | 6/1965 | Schick . |
| 3,239,913 | 3/1966 | Richmond ................ 228/120 |
| 4,489,123 | 12/1984 | Schijve et al. . |
| 4,808,461 | 2/1989 | Boyce et al. ............... 428/119 |
| 4,875,616 | 10/1989 | Nixdorf . |
| 5,041,321 | 8/1991 | Bendig . |
| 5,115,962 | 5/1992 | Anderson et al. ........... 228/120 |
| 5,186,776 | 2/1993 | Boyce et al. ............... 156/73.2 |
| 5,376,598 | 12/1994 | Preedy et al. . |
| 5,441,682 | 8/1995 | Baker . |
| 5,445,861 | 8/1995 | Newton et al. . |
| 5,466,506 | 11/1995 | Freitas et al. . |

FOREIGN PATENT DOCUMENTS 205116  12/1982  Japan .

*Primary Examiner*—Samuel M. Heinrich
*Attorney, Agent, or Firm*—John C. Hammar

[57] ABSTRACT

A double shear lap join is formed between metal and composite structure by welding Z-pins in the composite in the joint area to the metal tangs on the metal structure. The joint has modest strength but is less susceptible to shock damage than an adhesive bond or to notch effect crack propagation damage associated with fastened metal/composite joints.

9 Claims, 2 Drawing Sheets

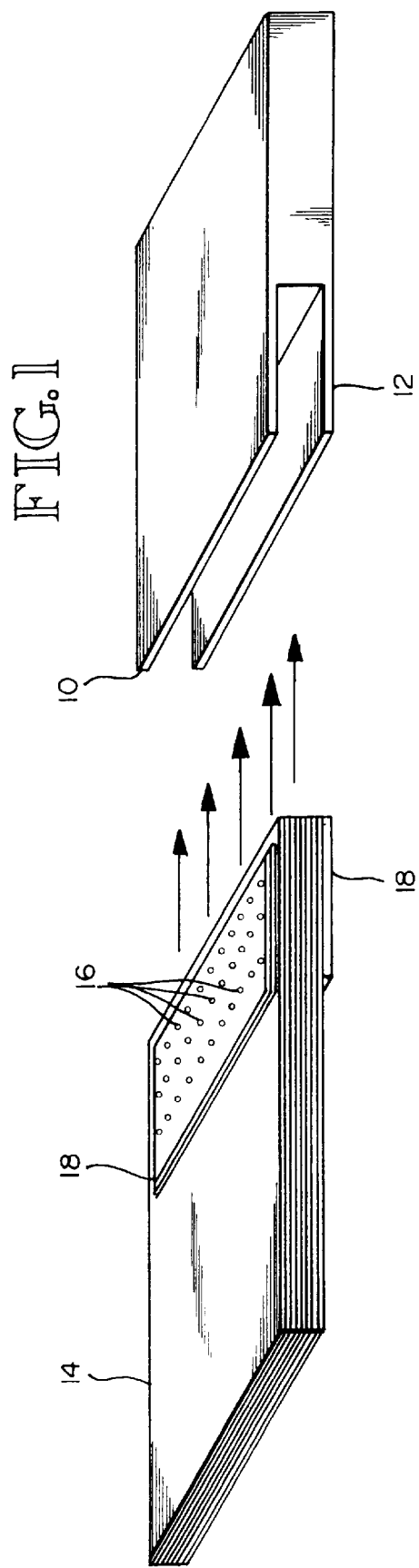

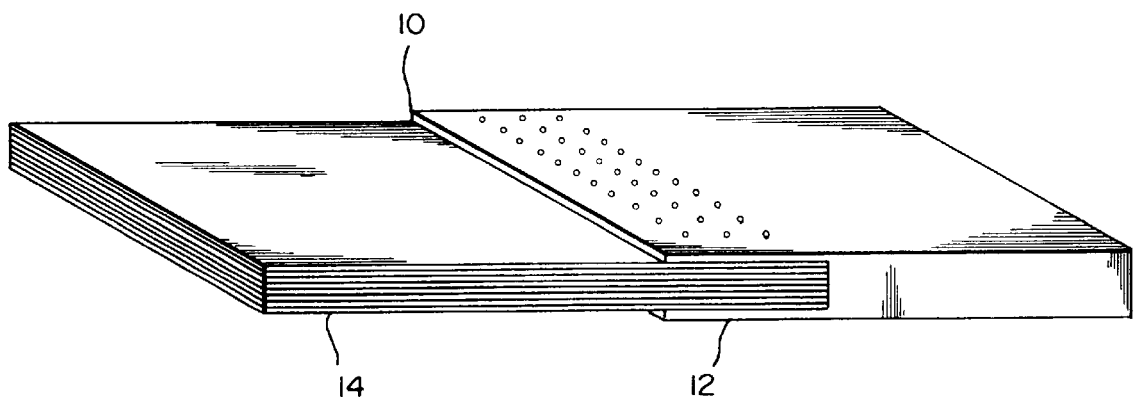

DOUBLE LAP JOINT WITH WELDED Z-PINS

The present application is a divisional application based upon U.S. patent application Ser. No. 08/619,957, filed Mar. 20, 1996, now U.S. Pat. No. 5,862,975.

TECHNICAL FIELD

The present invention relates to a structural double-lap shear joint for attaching fiber-reinforced composite structure, especially graphite/epoxy laminates, to metal structure using metal Z-pins that extend through the composite structure and that are welded to the metal.

BACKGROUND ART

Composite sandwich structures are used extensively in aerospace, automotive, and marine applications for primary and secondary structure. Standard sandwich structures include a foam core or honeycomb core and outer layers, called skins or face sheets, that usually are adhesively bonded to the core. The face sheets typically are fiber-reinforced organic matrix resin composites, having, fiberglass, carbon, ceramic, or graphite fibers and a thermosetting or thermoplastic matrix resin. The face sheets carry the applied loads, and the core transfers loads from one face sheet to the other, or the core also absorbs a portion of the applied loads. In either case, it is important that all layers maintain their connection to one another. Sandwich structure and sandwich structure for noise suppression and other applications are described in U.S. Pat. No. 5,445,861, which I incorporate by reference.

Foster-Miller has been active in basic Z-pin research. U.S. Pat. No. 5,186,776 describes a technique for adding Z-pin reinforcement to composite laminates. A dispensing needle vibrating at ultrasonic frequency heats and softens the matrix and penetrates the laminate, moving the laminate fibers aside. The needle inserts a reinforcing fiber into the laminate. The needle is withdrawn, allowing the matrix to cool around the composite. U.S. Pat. No. 4,808,461 describes a structure for localized reinforcement of composite structure including a body of thermally decomposable material that has substantially opposed surfaces, a plurality of reinforcing elements in the body that extend generally perpendicular to one body surface, and pressure intensifying structure on the other opposed body surface for applying driving force to the reinforcing elements for insertion into the composite structure as the body is subjected to elevated temperature and decomposes. I incorporate U.S. Pat. Nos. 4,808,461 and 5,186,776 by reference.

In U.S. patent application Ser. No. 08/582,297 entitled "Pin-Reinforced Sandwich Structure," which I incorporate by reference, I described a method of forming a pin-reinforced foam core sandwich structure including (i) positioning first and second face sheets of uncured fiber-reinforced resin (i.e., prepreg or B-stage thermoset) about a foam core having at least one compressible sublayer and a plurality of Z-pins spanning the foam between the face sheets and (ii) inserting the Z-pins into the face sheets during autoclave curing of the face sheet resin. During autoclave curing, the compressible sublayer is crushed and the Z-pins sink into one or both of the face sheets to form the pin-reinforced foam core sandwich structure. I also described column core structure made by removing at least some of the foam core by dissolving, eroding, melting, drilling, or the like to leave a gap between the face sheets. This structure (1) resists distortion and separation between layers, in particular, separation of the face sheets from the foam core; (2) maintains high structural integrity; (3) resists crack propagation; and (4) easily accommodates the removal of portions of foam core, as required by specific applications.

The foam core generally includes a high density foam sublayer, and at least one low density foam sublayer. The preferred arrangement includes a first and second low density foam sublayer, one placed on each side of the high density sublayer. The plurality of Z-pins are placed throughout the foam core in a regular array normal to the surface or slightly off-normal at an areal density of about 0.375 to 1.50% or higher, as appropriate, extending from the outer surface of the first low density foam sublayer through to the outer surface of the second low density foam sublayer. Expressed in different terms, we use 40–50 pins/in$^2$ in most applications. Preferably, the foam sublayers are polyimide or polystyrene, the Z-pins are stainless steel or graphite, and the face sheets are partially cured thermosetting fiber/resin or thermoplastic composite materials.

Fastening composite structure, especially to metal, is troublesome. The fasteners concentrate strain by being the principle load transfer paths. The holes cut through the composite either cut the reinforcing fibers or force unusual tow placements during layup. Strain concentration is particularly a concern in the "zero" plys where the matrix must carry the load from the fastener to the fibers in that ply. A joint that reduced the strain concentration and retained the integrity of the reinforcing fibers in the composite would provide a significant advantage. The joint of the present invention is promising for composite-metal joints of modest strength.

Fastening also is troublesome because it often requires altering the composite thickness in the edge band to accommodate bolt lengths. The layup design is made more complicated and the joint has reduced strength because of the reduced thickness (i.e. "gage").

Often composites will be adhesively bonded to the metal, but such bonds are unsatisfactory in many shock or vibration environments.

SUMMARY OF THE INVENTION

The structural double-lap shear joint of the present invention joins two metal tangs sandwiching the composite with a plurality of metal Z-pins that extend through the composite and that are welded to the tangs using resistance, laser, friction stir, or another suitable welding process. While a double shear lap joint is the most common connection I make, the invention also pertains to other joint configurations in which welds between the pins of the composite and the metal structure facilitate fastenerless connection. The metal/composite joint has superior performance over corresponding fastened joints which are plagued by the notch effect and bonded joints which are plagued by shock induced debonding in vibration environments.

The invention also relates to a method for fastener-free connection between a metal element and a composite member using welds between the metal element and Z-pins in the composite to provide the joint strength.

BRIEF DESCRIPTION OF THE DRAWINGS

FIG. 1 is a schematic isometric illustration assembly of a metal structure and a Z-pinned composite structure.

FIG. 2 is another schematic isometric illustrating a welded double shear lap joint of the present invention.

DETAILED DESCRIPTION OF A PREFERRED EMBODIMENT

As shown in FIG. 1, the metal/composite joint of the present invention generally includes a sandwich arrangement having two spaced tangs 10, 12 with the intervening gap filled with the fiber-reinforced resin composite 14. The tangs are relatively thin metal foils in the area where welds are formed so that there is higher assurance that welds will actually form. Metal Z-pins 16 extend through the composite 14 in densities of around 2% of the area or higher. I weld the pins to the tangs using resistance, friction stir, laser, electron beam, or another suitable welding approach. On some occasions I enhance the connection between the composite and metal tangs using a suitable adhesive 18, but I avoid the adhesive if the joint will be exposed to reoccurring shocks, especially from environmental vibrations. The pins and tangs generally are identical alloys of the same metal, typically titanium or an alloy. The composite can use any thermoset or thermoplastic resin, but typically is a graphite epoxy. In the case of thermosets I insert the pins at the prepreg or B-stage of curing. For thermoplastics, however, I am able to insert the pins through the tangs 10, 12 and composite 14 after preassembling the elements.

The pins may be normal to the plane defined by the tangs or may be interlaced in the manner I described in U.S. patent application Ser. No. 08/618,650 entitled "Interlaced Z-Pin Structures," which I incorporate by reference.

The metal/composite joint is a double lap shear joint when the pins are welded to the tangs. for environments requiring modest strengths for this connection, I have found the method to be promising. I have achieved strengths as high as 680 lb using a density of 40 pin/in$^2$ (only 7 pins actually welded). In my tests, I have had difficulty assuring that a weld forms between each pin with both tangs, so those strengths are deceptively low of these I ultimately expect to obtain.

I can use the welding technique in conjunction with conventional fasteners to distribute the strain concentration otherwise experienced with the fasteners. In a fastened/welded hybrid joint, I expect that it could use smaller fasteners since the total load will be dispersed to a larger number of load paths comprising the fasteners and the welded pins.

I might form the metal/composite joint having the welded pins followed by reinforcing the tang-to-body joint strength with suitable "doublers" as are common in the art. Care must be taken, however, to avoid decomposing or delaminating the composite when bonding the doublers to the tangs. Friction stir welding or induction brazing are two candidate processes for attaching the doublers to the foil tangs, because they are low temperature process or focus heating at the tang/doubler bond line.

To avoid galvanic corrosion, I might avoid the use of carbon fibers to reinforce the composite. In these circumstances then, I would substitute fiberglass or ceramic fibers.

The composite might actually be a metal foil/composite laminate of the type described in U.S. Pat. No. 4,489,123 and U.S. patent application Ser. No. 08/585,304 which I incorporate by reference. Additional details on Z-pinned structure are provided in U.S. patent application Ser. No. 08/582,297, "Pin-Reinforced Sandwich Structure."

Interlacing angled Z-pins works particularly well for reinforcing around bolt holes because it helps to restrict the face sheets from cracking. The interlaced Z-pins are optimally inserted at both plus and minus angles. The precise orientation of the Z-pins will vary according to the needs of the particular application. Generally the pin areal density is at least 2% (with interlaced pins or with normal pins) for welded joints, which typically is a higher density than I recommend simply for structural reinforcement. I also generally use pins with a larger diameter in the range of about 0.20–0.35 inch when making a welded joint. If the pins are angled, they form tiny trusses between the skins and their length and spacing is a function of the truss angle, as those of ordinary skill will understand. Precisely ordering the pin configuration, however, may provide the best performance, and Rorabaugh and Falcone suggest tetrahedral or hat section configurations.

The composite may be a foam core sandwich structure or a column core structure. If a high density sublayer is included in the composite, it usually should be made of a material that will not crush during autoclave curing, like polystyrene or polyimide foam. It might be syntactic foam having internal reinforcing spheres, a fiber-reinforced resin prepreg or composite, a fiberform or microform ceramic such as described in U.S. Pat. Nos. 5,376,598; 5,441,682; and 5,041,321 or in copending U.S. patent application Ser. Nos. 08/209,847 or 08/460,788, or a metal foil/resin composite laminate. The central sublayer 26 might also be a honeycomb core with the cells arranged normal to the plane of the face sheets.

The Z-pins may be any suitably rigid metal, e.g., stainless steel, titanium, copper. The Young's modulus of elasticity for the Z-pins is generally greater than $10^7$. Additionally, the Z-pins may be barbed, where appropriate, to increase their holding strength in the face sheets. A mixture of metal pins interspersed with glass, graphite, or carbon fibers is also a possibility.

The thickness of the face sheets and core may vary. We have obtained acceptable results using foam cores of between 0.125 and 1.25 inches thick. Exemplary face sheet thicknesses for a graphite/epoxy range between about 0.050 to 0.080 inches. Using thin face sheets has the advantage of requiring that the low density sublayer only crush over a corresponding small dimension to drive the Z-pins through the face sheets. The Z-pin are typically regularly spaced between 0.0625 to 0.25 inches from each other. The dimensions discussed, however, can vary greatly depending on the application intended for the resulting structure, the materials used to form the structure. The spatial distribution of Z-pins might change over the area of the weld with, for example, a higher density near the edges rather than in the middle. The pattern of Z-pins is illustrated as being rectangular but this pattern is merely one example of the pin distribution.

EXAMPLE 1

I implanted titanium Z-pins 0.018 inch in diameter at a density of 40 pins/in$^2$ in a quasi-isotropic AS4/3501-6 laminate ⅛ inch thick and 1.5 inch wide I attempted to weld the pins to upper and lower, 0.030 inch thick titanium face sheets using resistance welding. I, then, arc welded the face sheets to a titanium flange. I tested specimens in double lap shear using a tensile tester where I mounted the titanium flange in the upper grip and the laminate in the lower grip. On each specimen, I tried to weld twenty of the pins to the face sheets, but the process was blind, the welding head was small, and the thermoset composite tended to burn if the head dwelled any reasonable length of time. Nevertheless, my first specimen failed at 550 lbs. with 8 pins successfully welded. My second specimen failed at 672 lbs. with only 7 pins successfully welded. Each pin held an average load of over 80 lbs., which was an excellent proof of principle considering the processing limitations. I anticipate better performance using a thermoplastic resin in the composite, pins of larger diameter, and better control of the weld head relative to the pin location.

EXAMPLE 2

I prepared test specimens similar to those of Example 1, however, I used KIII thermoplastic polyimide resin and 0.25 inch diameter pins. In double lap shear tensile tests, I measured pull off loads of about 250 lbs. With only two pins welded, the average pin load was 125 lb/pin.

While I have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

I claim:

1. A fastener-free structural lap joint for structurally attaching weldable metal structure to fiber-reinforced resin composite structure along an interface, comprising the steps of:
   (a) incorporating metal Z-pin reinforcement in the composite structure in contact with the metal structure in the interface area at an areal density of at least about 2%; and
   (b) welding the metal structure to the pins to form a fastener-free lap joint, the pins having a diameter of about 0.20–0.35 inches.

2. The joint of claim 1 wherein the pins are titanium or titanium alloy, the metal structure is titanium or titanium alloy, and the composite is fiber reinforced in the X-Y plane.

3. The joint of claim 1 made by the process further comprising the step of:
   bonding the composite structure to the metal structure in the interface with an adhesive.

4. A fastener-free lap joint to connect a fiber-reinforced resin composite to a metal, comprising a product made by:
   at an interface between the composite and the metal, welding Z-pin reinforcement in the composite to the metal, the Z-pin reinforcement being metal fibers having a Young's modulus of at least $10^7$ and an areal density of at least about 2%.

5. The joint of claim 4 wherein the interface defines a reference plane and wherein the Z-pin reinforcement is oriented substantially normal to the reference plane.

6. The joint of claim 5 made by the process further comprising the step of:
   adhesively bonding the composite to the metal at the interface.

7. The method of claim 1 wherein welding is accomplished by resistance welding, electron beam welding, laser welding, or friction stir welding.

8. A structural joint free of traditional fasteners and joining a fiber-reinforced resin composite and a metal, comprising:
   in an area of overlap between the composite and the metal, a plurality of reinforcing pins of metal fiber at an areal density of at least about 2% embedded in the composite to reinforce the composite, each pin welded to the metal.

9. The structural joint of claim 8 wherein the metal includes at least two spaced tangs that sandwich the composite and wherein each pin is welded to both tangs.

* * * * *